(12) United States Patent
Juels et al.

(10) Patent No.: US 8,954,728 B1
(45) Date of Patent: Feb. 10, 2015

(54) GENERATION OF EXFILTRATION-RESILIENT CRYPTOGRAPHIC KEYS

(71) Applicant: EMC Corporation, Hopkinton, MA (US)

(72) Inventors: Ari Juels, Brookline, MA (US); Nikolaos Triandopoulos, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 13 days.

(21) Appl. No.: 13/730,343

(22) Filed: Dec. 28, 2012

(51) Int. Cl.
 *H04L 29/06* (2006.01)

(52) U.S. Cl.
 CPC ........................................ *H04L 63/10* (2013.01)
 USPC ............................................................ 713/155

(58) Field of Classification Search
 CPC ............................................................ H04L 9/00
 USPC ............................................................ 713/155
 See application file for complete search history.

(56) References Cited

U.S. PATENT DOCUMENTS

| | | | | |
|---|---|---|---|---|
| 6,034,618 | A * | 3/2000 | Tatebayashi et al. | 340/5.8 |
| 7,979,697 | B2 * | 7/2011 | Phillips et al. | 713/160 |
| 2001/0034839 | A1 * | 10/2001 | Karjoth et al. | 713/190 |
| 2002/0136401 | A1 * | 9/2002 | Hoffstein et al. | 380/30 |
| 2008/0095360 | A1 * | 4/2008 | Vuillaume et al. | 380/44 |
| 2009/0112883 | A1 * | 4/2009 | Yoshioka | 707/10 |
| 2010/0115593 | A1 * | 5/2010 | Uchida et al. | 726/5 |
| 2013/0099891 | A1 * | 4/2013 | Nandakumar | 340/5.2 |

* cited by examiner

*Primary Examiner* — Dant Shaifer Harriman
(74) *Attorney, Agent, or Firm* — Ryan, Mason & Lewis, LLP

(57) ABSTRACT

Improved techniques are provided for the generation of exfiltration-resilient cryptographic keys. A method is provided for generating exfiltration-resilient cryptographic keys for authentication and/or digital signing. A set of authentication information sk[i] is stored in a device associated with a user and a set of public keys pk[i] are provided to a verifier corresponding to the set of authentication information sk[i], where sk[i] is mapped to pk[i] using a hash function. The device obtains a challenge from the verifier comprising a sequence C of k indices. A response is provided to the verifier comprising elements of the set of authentication information sk[i] corresponding to the k indices. The set of authentication information sk optionally has a size that satisfies one or more leakage-resilient criteria.

25 Claims, 5 Drawing Sheets

500

GENERATION OF EXFILTRATION-RESILIENT CRYPTOGRAPHIC KEYS

FIELD

The field relates generally to cryptography, and more particularly, to techniques for securing communications over a network.

BACKGROUND

In order to gain access to applications or other resources via a computer or another user device, users are often required to authenticate themselves by entering authentication information. Such authentication information may include, for example, passcodes that are generated by a security token carried by a user. These passcodes may be, for example, one-time passcodes that are generated using a time-synchronous or event-based algorithm.

Some user authentication systems employ challenge-response techniques. In response to a challenge c, the user provides a response $r=f(\kappa; c)$, for some cryptographic function f (for example, a hash function) and a secret key $\kappa$.

The leakage of cryptographic keys presents a challenge in a number of settings. Computing devices are often vulnerable to side-channel attacks, which extract secret information through channels that are not explicitly designed into the system. Attacks exploiting a wide range of side-channels, e.g., analysis of power, timing and/or faults, are well documented. More recently, side-channels have been studied in virtualized systems that break the isolation abstraction between virtual machines.

In addition to side-channels, exfiltration of key data (i.e., an unauthorized release of such key data) can occur when a device has been compromised by, e.g., a virus or a Trojan horse that removes sensitive device information. For instance, the theft of credentials from mobile devices has become a major industry concern.

A number of techniques have been proposed or suggested for leakage-resilient cryptographic primitives. Leakage-resilient cryptographic primitives are schemes in which, assuming an attacker is able to leak only a limited amount of information from a victim device, the cryptographic primitive remains secure. For scenarios in which leakage occurs through device compromise, most leakage-resilient cryptographic schemes operate within what is known as the bounded storage model of attack. An attacker is presumed to be able to leak data at most l (say, l bits) over the lifetime of a cryptographic private key sk, with corresponding public key pk. A cryptographic primitive secure in this model is regarded as secure if the cryptographic primitive remains unbreakable no matter which l bits of data are leaked.

Leakage-resilient cryptographic schemes in the bounded storage model are typically designed to withstand attacks involving substantial data exfiltration (i.e., large l), and thus employ very large keys sk (a fundamental requirement being that $|sk|>l$). Practical constraints on the adversary motivate this model, e.g., limited bandwidth available for exfiltration, limited storage available to the attacker and the risk of detection of exfiltration of large amounts of data.

A number of existing leakage-resilient cryptographic schemes have a number of drawbacks. First, the secret key sk consumes considerable storage. While storage is abundant on some devices, it may be costly or prohibitive in many others, e.g., on mobile devices. In addition, key generation is computationally intensive. For example, to compute the secret key sk, full key generation is required for each individual secret key sk[i]. In practice, to generate a key sk of, e.g., 8 Gigabits (Gb), using an underlying exponent size of, e.g., 1024 bits, would require 223 modular exponentiations. For a computationally constrained device, e.g., a mobile device, this computation can be onerous. Finally, online computational requirements are high. For example, on the order of tens of modular exponentiations may be required by the prover and verifier in a practically parameterized setting.

A need therefore exists for improved techniques for generating exfiltration-resilient cryptographic keys that can be used, for example, for authentication and digital signing.

SUMMARY

One or more illustrative embodiments of the present invention provide improved techniques for the generation of exfiltration-resilient cryptographic keys. In accordance with an aspect of the invention, a method is provided for authentication and digital signing. A set of authentication information sk[i] is stored in a device associated with a user and a set of public keys pk[i] are provided to a verifier corresponding to the set of authentication information sk[i], where sk[i] is mapped to pk[i] using a hash function. The device obtains a possibly randomized challenge from the verifier comprising a sequence C of k indices. A response is provided to the verifier comprising elements of the set of authentication information sk[i] corresponding to the k indices. The set of authentication information sk optionally has a size that satisfies one or more leakage-resilient criteria.

In one exemplary embodiment, the set of authentication information sk[i] is obtained by encrypting existing data d[i] on the device under a symmetric key $\kappa$. The set of public keys pk[i] can be derived as (i) a hash of the set of authentication information sk[i]; (ii) a head of a hash chain derived from sk[i]; and/or (iii) a combination of a Merkle tree and the hash chain.

In a digital signing implementation, a message m to be signed is mapped to the challenge for the digital signing by applying a possibly randomized, publicly known function $f$ to m ($C_m=f(m)$). A signature of the message m corresponds to the response to the challenge $C_m$, and a verifier verifies a claimed signature of the message m by computing the challenge $C_m$ and verifying the claimed signature of m as being the response to the challenge $C_m$. In an authentication implementation, the challenge is received at the device from the verifier responsive to a request from the user to access a protected resource.

The disclosed techniques for generating exfiltration-resilient cryptographic keys of the illustrative embodiments overcome one or more of the problems associated with the conventional techniques described previously. These and other features and advantages of the present invention will become more readily apparent from the accompanying drawings and the following

DETAILED DESCRIPTION

As will be described herein, the present invention, in one or more illustrative embodiments, provides a cryptographic primitive for authentication or digital signing that is resilient to leakage of secret data from a victim device. One or more embodiments use large cryptographic keys (e.g., sufficiently large that exfiltration is difficult for an attacker). The disclosed challenge-response scheme achieves high computational and communication efficiency by means of key sampling. For storage efficiency, keys in an exemplary scheme may be derived from data already resident on the authenticating device, such as photographs.

The disclosed challenge-response scheme may be used to protect software-resident cryptographic keys on mobile devices from theft by viruses, Trojans, or malicious applications (apps).

Figure 1:
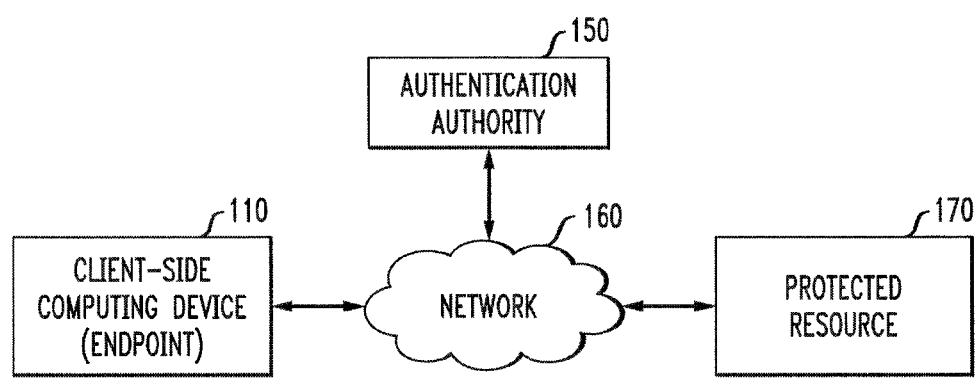
FIG. 1 is a diagram illustrating an example network environment in which one or more embodiments of the present invention can operate.

FIG. 1 illustrates an exemplary network environment in which aspects of the present invention can operate. As shown in FIG. 1, an exemplary client-side computing device (CSCD) 110 communicates with a protected resource 170 over a network 160. In an exemplary implementation, the user must authenticate with an authentication authority 150 using authentication information generated in accordance with an embodiment of the invention before obtaining access to the protected resource 170. The network 160, may comprise, for example, a global computer network such as the Internet, a wide area network (WAN), a local area network (LAN), a satellite network, a telephone or cable network, or various portions or combinations of these and other types of networks.

The user of the CSCD 110 is authenticated with the protected resource 170 using a variable key that may be generated in accordance with the present invention. It is to be appreciated that a given embodiment of the disclosed system may include multiple instances of CSCD 110, authentication authority server 150 and protected resource 170, and possibly other system components, although only single instances of such components are shown in the simplified system diagram of FIG. 1 for clarity of illustration.

The CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, a wired telephone, a television set top box, or any other information processing device which can benefit from the use of authentication techniques in accordance with the invention. The CSCD 110 may also be referred to herein as simply a "user." The term "user" should be understood to encompass, by way of example and without limitation, a user device, a person utilizing or otherwise associated with the device, or a combination of both. A password or other authentication information described as being associated with a user may, for example, be associated with a CSCD device 110, a person utilizing or otherwise associated with the device, or a combination of both the person and the device.

The authentication authority 150 is typically a third party entity that processes authentication requests on behalf of web servers and other resources, and verifies the authentication information that is presented by a CSCD 110.

The protected resource 170 may be, for example, an access-controlled application, web site or hardware device. In other words, a protected resource 170 is a resource that grants user access responsive to an authentication process, as will be described in greater detail below. The protected resource 170 may be, for example, a remote application server such as a web site or other software program or hardware device that is accessed by the CSCD 110 over a network 160.

Exfiltration-Resilient Cryptographic Keys

As discussed hereinafter, the disclosed challenge-response scheme is an extension of existing leakage resilient challenge-response schemes. See, for example, Joël Alwen et al., "Leakage-Resilient Public-Key Cryptography in the Bounded-Retrieval Model," Advances in Cryptology—CRYPTO 2009, 29th Annual Int'l Cryptology Conf., 36-54 (2009) and/or Joël Alwen et al., "Survey: Leakage Resilience and the Bounded Retrieval Model, Information Theoretic Security, 4th Int'l Conf., ICITS 2009, 1-18 (2009), each incorporated by reference herein.

In the identification variant of the disclosed challenge-response scheme, a challenge consists of a sequence C of k indices, where $C=\{c[1], c[2], \ldots, c[k]\}$, $c[i] \in [1, n]$, $1 \le i \le k$, and k is a security parameter. Indices in C may be generated, via a standard optimization, from a seed c (seed) via a pseudorandom number generator (PRNG). For a discussion of a suitable PRNG, see, for example, U.S. patent application Ser. No. 13/334,709, filed Dec. 23, 2011, entitled "Methods and Apparatus for Generating Forward Secure Pseudorandom Numbers," incorporated by reference herein. The seed c may then be sent as a challenge in lieu of C. Challenge selection may be enhanced, using standard techniques, with randomness provided by the prover (e.g., CSCD 110).

A digital signature variant of the disclosed challenge-response scheme can be constructed from an identification scheme using well known techniques, e.g., the Fiat-Shamir heuristic. See, e.g., Amos Fiat and Adi Shamir, "How to Prove Yourself: Practical Solutions to Identification and Signature Problems,". CRYPTO 1986, 186-194 (1986), incorporated by reference herein.

Given a challenge C, the prover (e.g., CSCD 110) responds with proofs of knowledge/possession of $\{sk[i]\}_{i \in C}$ to the verifier (e.g., authentication authority 150).

Key Derivation and Generation

To address the storage drawback (where the secret sk consumed considerable storage with conventional techniques), the disclosed scheme may (optionally) use existing, stored data d to compose secret key sk, along with a subsidiary symmetric key κ. For instance, d might be the collection of photos stored on the mobile phone of a user, files on a user's Network Attached Storage (NAS) drive and/or files in a cloud storage system.

Figure 2:
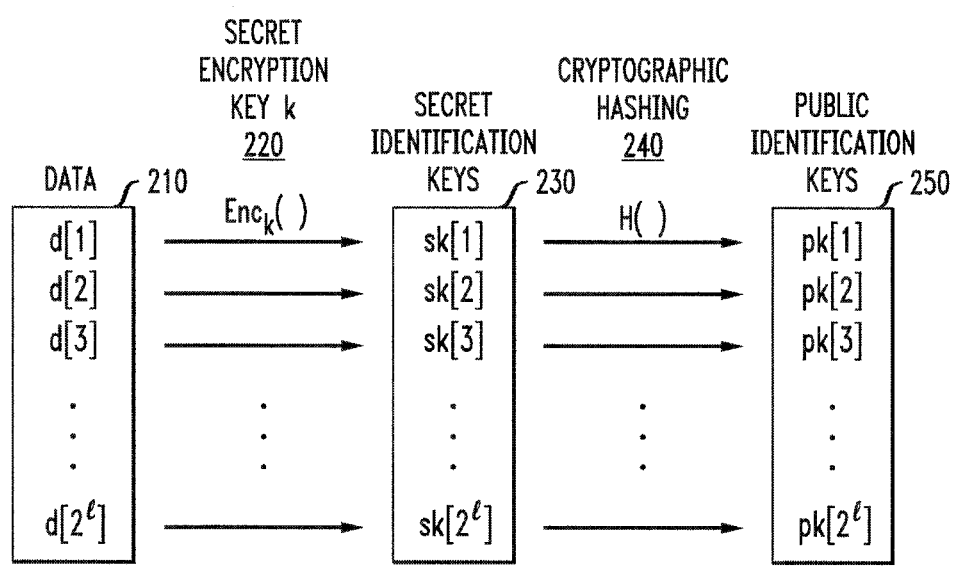
FIG. 2 illustrates exemplary techniques for computing keys in accordance with an exemplary embodiment.

FIG. 2 illustrates exemplary techniques for computing keys in accordance with an exemplary embodiment. As shown in FIG. 2, a block 210 of existing data d[i] is encrypted under symmetric key κ (220) to derive secret identification keys 230 sk[i] under, e.g., a tweakable block cipher. See, e.g., http://en.wikipedia.org/wiki/Block_cipher#Tweakable_block_ciphers. For convenience, it is assumed that sk contains n constituent keys, for n equal to a power of 2, say $n=2^l$. As discussed further below, the data d may change over time, as the disclosed scheme is robust to incremental changes in d.

In the disclosed system, each individual secret key sk[i] has a corresponding public key pk[i]. In the embodiment of FIG. 2, the public identification keys 250 pk[i] are derived as the hash H( ) 240 of sk[i] (potentially with ancillary data). Key generation is thus an efficient operation.

Figure 3:
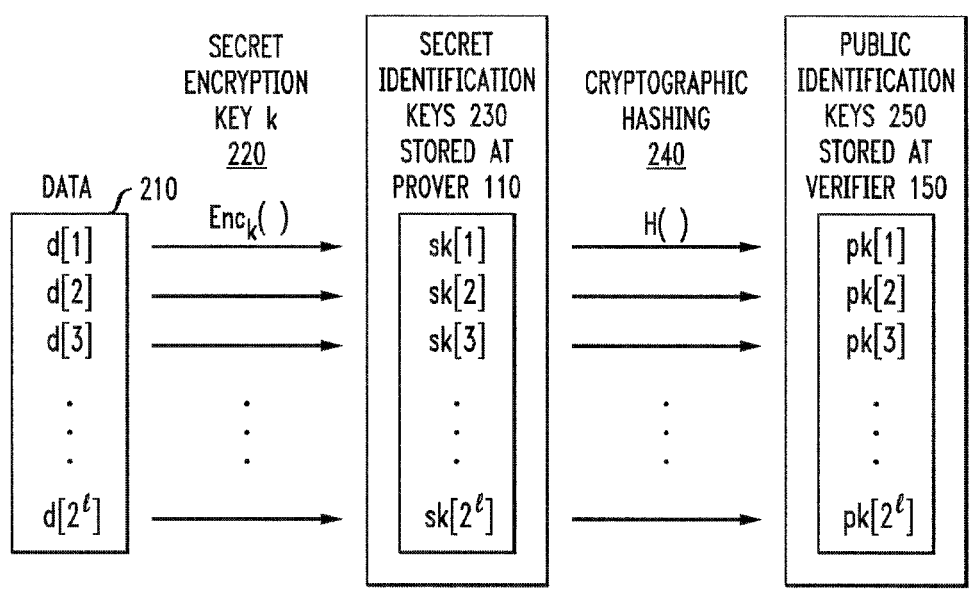
FIG. 3 illustrates the distribution of the keys of FIG. 2.

FIG. 3 illustrates the distribution of the keys of FIG. 2. As shown in FIG. 3, the secret identification keys 230 sk[i] are stored by the prover (e.g., the CSCD 110). The secret identification keys 230 sk[i] can be stored by the prover explicitly (i.e., the result of the encryption under symmetric key κ (220)) or implicitly through the data 210 D (d[1], ... d[$2^l$])).

In addition, the public identification keys 250 pk[i] are sent to the verifier (e.g., authentication authority 150).

Responding to a Challenge

In a standard challenge-response scheme, the prover proves possession of a given private key sk[i] via a zero-knowledge-type proof.

Figure 4:
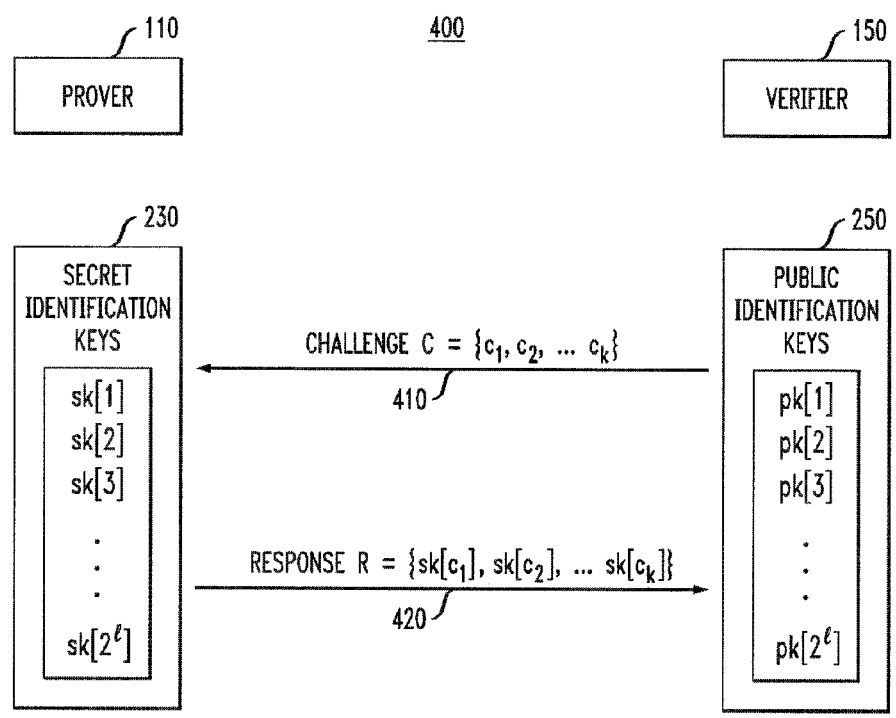
FIG. 4 illustrates an exemplary challenge-response verification process incorporating aspects of the present invention.

FIG. 4 illustrates an exemplary challenge-response verification process 400 incorporating aspects of the present invention. The embodiment of FIG. 4 uses a one-time authentication scheme that involves revealing a pre-image of a hash function. That is, given a challenge 410 from the verifier 150 equal to $\{c_1, c_2, \ldots c_k\}$, the prover 110 computes a response 420 that consists of: the set of secret keys $S=\{sk[i]\}_{i \in C}$.

While the verifier 150 knows the global public key pk, the verifier 150 must also be able to determine and check the correctness of individual public keys $P=\{pk[i]\}_{i \in C}$. In one embodiment, the prover 110 may transmit P directly to the verifier 150 along with S.

In a further variation, the verifier 150 verifies the following:

$H(sk[c_1])=pk[c_1]$, $H(sk[c_2])=pk[c_2]$,

...; and $H(sk[c_k])=pk[c_k]$.

Generally, the disclosed scheme may make use of any of a number of standard authentication mechanisms to enable the verifier to check the correctness of keys in P.

For example, a standard Merkle hash tree can be constructed over pk[1], ..., pk[n] at the time of key generation, letting the global public key pk be the root of this tree.

Alternatively, public keys pk[1], ..., pk[n] can be individually digitally signed either by a designated verifier 150 (in a concrete identification case or a concrete digital signing case) or by a trusted third party or even by the prover 110 itself using a secret key that is deleted after the signing process. In this extension, keys pk[1], ..., pk[n] and their signatures sig[1], ..., sig[n] need not necessarily be publicly available to the verifier 150 but they can be given on demand during the verification time. For instance, in the case of identification (authentication) if the challenge consists of $c_1, c_2, \ldots, c_k$ then the verifier 150 receives a response that comprises $sk[c_1]$, $sk[c_2]$, ..., $sk[c_k]$ and $sig[c_1]$, $sig[c_2]$, ..., $sig[c_k]$. To verify the response, the verifier 150 first computes the hash values $H(sk[c_1])$, $H(sk[c_2])$, ..., $H(sk[c_k])$ and then verifies that $sig[c_1], sig[c_2], \ldots, sig[c_k]$ are valid signatures of these hash values.

According to one aspect of the invention, leaves of the key-update tree are employed in a pseudo-random order, rather than sequentially, as in a Merkle signature. See, e.g., Ralph C. Merkle, "A Digital Signature Based on a Conventional Encryption Function," Advances in Cryptology—CRYPTO '87, A Conf. on the Theory and Applications of Cryptographic Techniques, 369-78 (1987). The use of pseudo-random leaves is important in protecting against key-leakage attacks. The attacker must be unable to predict the portion of the key sk to be used by the prover.

The construction of a Merkle tree path from scratch requires computation over the full set of leaves (impractical for on-the-fly operation). A known optimization is to store an upper portion of the Merkle tree. For instance, if the top t levels are stored, namely, the hash values at levels 0, 1, ..., t of the tree, $1 \le t \le l$, then only a $\frac{1}{2}^t$-fraction of the $n=2^l$ leaves must be computed in the construction of a path.

pk[i] can be computed as the head of a hash chain derived from sk[i], rather than as the result of a single hash (i.e., a hash chain of length one). Hash chains are used for authentication in a number of systems, e.g., the well-known S/KEY authentication scheme. In such constructions, however, the verifier 150 must be synchronized in some manner—via time or some other shared state—to ensure against reuse of stale secret keys. Given the use of a hash chain in the disclosed system, the prover 110 reveals not sk[i] for $i \in C$, but the next, unrevealed pre-image corresponding to pk[i].

Figure 5:
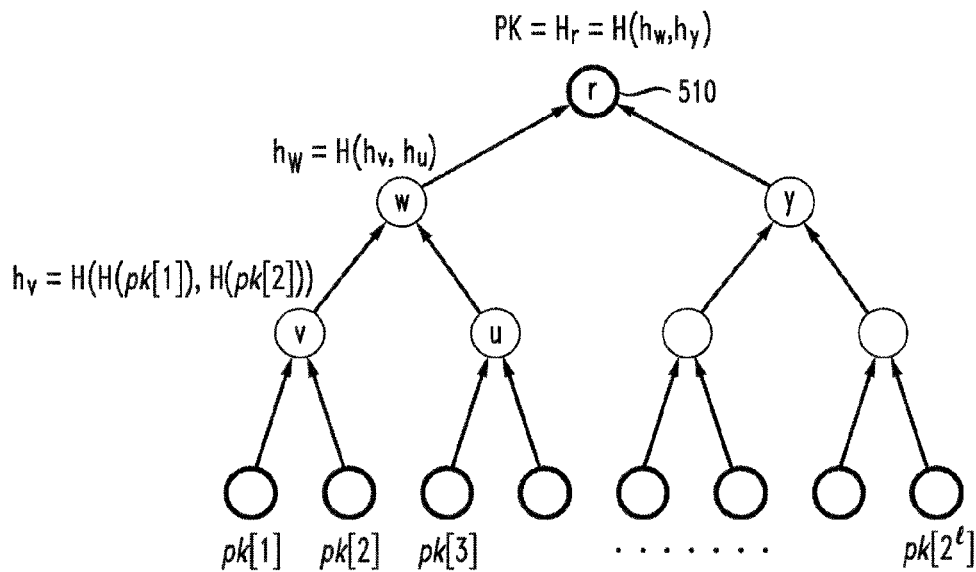
FIG. 5 illustrates an exemplary process for public key compression of a Merkle tree 500 over pk[i] values.

FIG. 5 illustrates an exemplary process for public key compression of a Merkle tree 500 over pk[i] values, where only the hash of the root node 510 ($H_r$) is made public. In addition, when challenged the Prover 110 provides the verification paths of the challenged positions. As shown in FIG. 5, each node in the Merkle tree 500 is obtained as the concatenation of the hash of its child nodes, for instance, as follows:

$h_v = H(H(pk[1]), H(pk[2]))$;

$h_w = H(h_v, h_u)$; and $H_r = H(h_w, h_y)$.

Tolerating Key Churn/Corruption

In conventional cryptographic schemes, the verifier accepts an authentication only if all secret-key proofs of possession are correct. Use of aggregation to reduce response sizes necessitates this approach.

The disclosed scheme, however, permits a variant in which the verifier 150 accepts an authentication when only a portion of these proofs are correct. For instance, the verifier 150 might accept an authentication if at least a δ-fraction of proofs are correct, for security parameter δ<1.

This relaxation is beneficial in that it permits a prover 110 to use a set of secret keys that depend on malleable data d, i.e., data subject to change over time. For instance, if the photo album on a user's mobile device serves as a secret key, and the user deletes a small number of photos, the device may still be able to authenticate successfully if δ is set appropriately. Further refinements are possible. For example, the data loss or corruption tolerated by the verifier may be content-dependent, e.g., in the case of use of photos, the verifier 150 might tolerate missing/corrupted keys corresponding to a set of up top photos, for some parameter p.

Example Deployment

Consider an application for identification in a computer tablet containing 32 GB of photo data d. Suppose blocks are of size 256 bits (16 bytes). Thus, there are 230 key blocks in sk. For simplicity, consider δ=1.

Suppose that an attacker can leak, for example, at most 7 GB of data from the device (or at least, can handle at most 7 GB of such key data). Information-theoretically, the adversary can learn at most 128 bits of information about at most a 14/32-fraction of all blocks, referred to as "red" blocks.

Suppose that a response 420 consists of m=64 blocks and that at most 220 responses are generated for sk. Then, at most 226 blocks will be revealed via identification responses. Those blocks that are not red blocks and have not been revealed via signing are referred to as "black" blocks. It can be seen that the total number of "black" blocks is always at least half the total set of blocks.

Suppose that it is infeasible for the attacker to generate a valid path for a black block. If m=64, then, the probability that a challenge will generate indices pointing to no black blocks is at most $1/2^{64}$. This is, then, an upper bound on the probability that the attacker can successfully mount an attack against the identification scheme, i.e., cause a clone device to produce a valid response to a challenge.

A path will have length 30 in this example. Thus, its constituent blocks will be 480 bytes in aggregate. Thus, a response will be about 32 k bytes in size.

Conclusion

Figure 6:
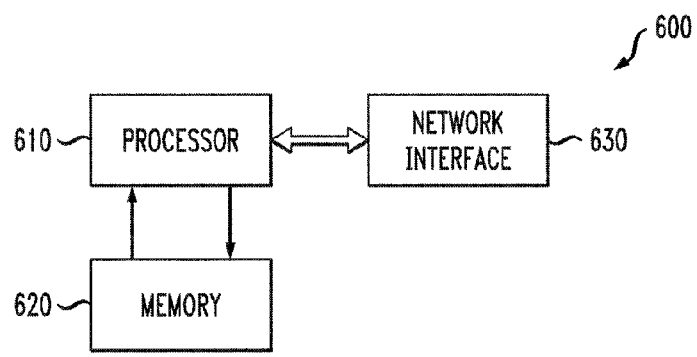
FIG. 6 illustrates one possible implementation of a given client-side computing device, authentication authority, protected resource or another processing device of the example network environment of FIG. 1.

FIG. 6 illustrates one possible implementation of a given client-side computing device 110, authentication authority 150, protected resource 170 or another processing device of the example network environment of FIG. 1. The processing device 600 in this implementation includes a processor 610 coupled to a memory 620 and a network interface 630. These device elements may be implemented in whole or in part as a conventional microprocessor, digital signal processor, application-specific integrated circuit (ASIC) or other type of circuitry, as well as portions or combinations of such circuitry elements.

As will be appreciated by those skilled in the art, portions of an authentication technique in accordance with an embodiment of the invention can be implemented at least in part in the form of one or more software programs that are stored in memory 620 and executed by the corresponding processor 610. The memory 620 is also used for storing information used to perform computations or other operations associated with the disclosed authentication on techniques.

As previously indicated, the above-described embodiments of the invention are presented by way of illustrative example only. Numerous variations and other alternative embodiments may be used, as noted above. The present invention provides new general-purpose techniques for generating exfiltration-resilient keys.

In one variation, cryptographic nonces are employed in conjunction with the present invention to defend against replay attacks.

While the present invention has been primarily implemented using an authentication environment, the present invention also applies to digital signing, as would be apparent to a person of ordinary skill in the art. In a digital signing implementation, aspects of the present invention can be employed by having the message m to be signed be mapped to a challenge $C_m$ by applying a possibly randomized publicly known function f to m, i.e., $C_m=f(m)$. Then, the signature of message m corresponds to the response (in the identification/authentication case) to challenge $C_m$. In the case where the mapping f is randomized, the signature may also include the randomness used by the mapping. To verify a claimed signature on message m, the verifier computes $C_m$ and verifies the claim signature of m as being the response to challenge $C_m$ (in the identification/authentication case). Additional details regarding certain conventional cryptographic techniques referred to herein may be found in, e.g., A. J. Menezes et al., Handbook of Applied Cryptography, CRC Press, 1997, which is incorporated by reference herein.

The term "authentication information" as used herein is intended to include passwords, passcodes, answers to life questions, or other authentication credentials, or values derived from such authentication credentials, or more generally any other information that a user may be required to submit in order to obtain access to an access-controlled application or to secure communications. Although the illustrative embodiments are described herein in the context of security keys, it is to be appreciated that the invention is more broadly applicable to any other type of authentication information.

Advantageously, the illustrative embodiments do not require changes to existing communication protocols. It is therefore transparent to both existing applications and communication protocols.

While exemplary embodiments of the present invention have been described with respect to processing steps in a software program, as would be apparent to one skilled in the art, various functions may be implemented in the digital domain as processing steps in a software program, in hardware by a programmed general-purpose computer, circuit elements or state machines, or in combination of both software and hardware. Such software may be employed in, for example, a hardware device, such as a digital signal processor, application specific integrated circuit, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It should again be emphasized that the particular authentication and communication techniques described above are provided by way of illustration, and should not be construed as limiting the present invention to any specific embodiment or group of embodiments. Also, the particular configuration of system elements, and their interactions, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method, comprising:
    storing a set of authentication information sk[i] in a device associated with a user;
    providing a set of public keys pk[i] to a verifier corresponding to said set of authentication information sk[i], where sk[i] is mapped to pk[i] using a hash function;
    obtaining a challenge at said device from said verifier, wherein the challenge comprises a sequence C of k indices of elements of said set of authentication information sk[i]; and
    providing a response to said verifier comprising said elements of said set of authentication information sk[i] corresponding to said k indices.

2. The method of claim 1, wherein said set of authentication information sk[i] is obtained by encrypting existing data d[i] on said device under a symmetric key κ.

3. The method of claim 1, wherein said set of public keys pk[i] are derived as a hash of said set of authentication information sk[i].

4. The method of claim 1, wherein said set of public keys pk[i] are derived as a head of a hash chain derived from sk[i].

5. The method of claim 4, wherein said verifier verifies a response to said challenge by providing a next, unrevealed pre-image corresponding to said set of public keys pk[i].

6. The method of claim 4, wherein said set of public keys pk[i] are derived using a combination of a Merkle tree and said hash chain.

7. The method of claim 1, wherein said response comprises a pre-image of a hash function.

8. The method of claim 1, wherein said verifier applies a hash function to said elements in said response and compares a result of said hash functions to said set of public keys pk[i] corresponding to said k indices.

9. The method of claim 1, wherein said challenge is performed for one or more of authentication and digital signing.

10. The method of claim 9, wherein a message m to be signed is mapped to said challenge for said digital signing by applying a publicly known function $f$ to m ($C_m=f(m)$).

11. The method of claim 10, wherein a signature of said message m corresponds to said response to said challenge $C_m$.

12. The method of claim 11, wherein a verifier verifies a claimed signature of said message m by computing said challenge $C_m$ and verifying the claimed signature of m as being the response to said challenge $C_m$.

13. The method of claim 9, wherein said obtaining step for said authentication further comprises receiving said challenge at said device from said verifier responsive to a request from the user to access a protected resource.

14. The method of claim 1, wherein said set of authentication information sk has a size that satisfies one or more leakage-resilient criteria.

15. The method of claim 1, further comprising the step of using one or more cryptographic nonces to defend against replay attacks.

16. The method of claim 1, wherein said step of providing said set of public keys pk[i] to said verifier can employ public key compression using one or more Merkle trees.

17. The method of claim 1, wherein said step of providing said set of public keys pk[i] to said verifier further comprises the steps of digitally signing said set of public keys pk[i] using one or more secret keys and providing said produced digital signatures.

18. The method of claim 17, wherein said verifier verifies a response to a challenge of $c_1, c_2, \ldots, c_k$ by computing one or more of hash values $H(sk[c_1]), H(sk[c_2]), \ldots, H(sk[c_k])$ and verifying that $sig[c_1], sig[c_2], \ldots, sig[c_k]$ are valid signatures for said computed hash values.

19. A non-transitory tangible machine-readable recordable storage medium, wherein one or more software programs when executed by one or more processing devices implement the steps of the method of claim 1.

20. An apparatus, comprising:
    a memory; and
    at least one hardware device, coupled to the memory, operative to implement the following steps:
    store a set of authentication information sk[i] in a device associated with a user;
    provide a set of public keys pk[i] to a verifier corresponding to said set of authentication information sk[i], where sk[i] is mapped to pk[i] using a hash function;
    obtain a challenge at said device from said verifier, wherein the challenge comprises a sequence C of k indices of elements of said set of authentication information sk[i]; and
    provide a response to said verifier comprising said elements of said set of authentication information sk[i] corresponding to said k indices.

21. The apparatus of claim 20, wherein said set of authentication information sk[i] is obtained by encrypting existing data d[i] on said device under a symmetric key κ.

22. The apparatus of claim 20, wherein said set of public keys pk[i] are derived as one or more of a hash of said set of authentication information sk[i]; a head of a hash chain derived from sk[i]; and a combination of a Merkle tree and said hash chain.

23. The apparatus of claim 20, wherein said verifier applies a hash function to said elements in said response and compares a result of said hash functions to said set of public keys pk[i] corresponding to said k indices.

24. The apparatus of claim 20, wherein said challenge is performed for one or more of authentication and digital signing.

25. The apparatus of claim 20, wherein said set of authentication information sk has a size that satisfies one or more leakage-resilient criteria.

\* \* \* \* \*